(12) United States Patent
Sato et al.

(10) Patent No.: US 9,415,698 B2
(45) Date of Patent: Aug. 16, 2016

(54) HYBRID VEHICLE

(71) Applicant: TOYOTA JIDOSHA KABUSHIKI KAISHA, Toyota-shi, Aichi-ken (JP)

(72) Inventors: Keita Sato, Toyota (JP); Hiroki Endo, Nissin (JP); Koji Hokoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/969,115

(22) Filed: Dec. 15, 2015

(65) Prior Publication Data

US 2016/0176310 A1 Jun. 23, 2016

(30) Foreign Application Priority Data

Dec. 19, 2014 (JP) .................................. 2014-257651

(51) Int. Cl.
| | |
|---|---|
| *B60W 20/00* | (2016.01) |
| *B60L 11/18* | (2006.01) |
| *B60L 3/00* | (2006.01) |
| *B60L 15/20* | (2006.01) |

(52) U.S. Cl.
CPC ........... *B60L 11/1861* (2013.01); *B60L 3/0084* (2013.01); *B60L 11/1809* (2013.01); *B60L 15/2045* (2013.01); *B60L 2260/26* (2013.01)

(58) Field of Classification Search
CPC .............. B60L 11/1861; B60L 3/0084; B60L 11/1809; B60L 15/2045; B60L 2260/26; B60L 15/20; B60L 2260/20; B60W 20/19; B60W 20/40; B60W 10/04; B60W 10/06; B60W 10/08; B60W 30/182; B60W 30/188; Y10S 903/93

See application file for complete search history.

(56) References Cited

U.S. PATENT DOCUMENTS

| | | | | |
|---|---|---|---|---|
| 8,256,547 | B2 * | 9/2012 | Ichikawa | B60K 6/445 180/65.265 |
| 8,694,187 | B2 * | 4/2014 | Yamazaki | B60K 6/365 701/22 |
| 8,781,665 | B2 * | 7/2014 | Yamamoto | B60W 10/08 180/65.23 |
| 8,924,060 | B2 * | 12/2014 | Yamamoto | B60W 10/06 180/65.23 |
| 9,014,891 | B2 * | 4/2015 | Takayanagi | B60K 6/445 180/65.265 |
| 2010/0052588 | A1 * | 3/2010 | Okamura | B60L 15/2045 318/434 |
| 2010/0145560 | A1 * | 6/2010 | Komatsu | B60K 6/365 701/22 |

(Continued)

FOREIGN PATENT DOCUMENTS

| | | |
|---|---|---|
| EP | 2 792 561 A1 | 10/2014 |
| JP | 2013-252853 | 12/2013 |
| WO | WO 2013/088509 A1 | 6/2013 |

*Primary Examiner* — Hau Phan
*Assistant Examiner* — Jacob Meyer
(74) *Attorney, Agent, or Firm* — Finnegan, Henderson, Farabow, Garrett & Dunner, LLP

(57) ABSTRACT

An ECU may make a changeover between EV running and HV running in accordance with a running situation in each of a CD mode and a CS mode. A start power threshold of an engine at the time when the CD mode is selected may be larger than the start power threshold at the time when the CS mode is selected. Then, the ECU may change the driving force characteristics of a vehicle depending on whether the CD mode or the CS mode is selected that may result in the vehicle driving torque for the same vehicle speed and the same accelerator opening degree being larger when the CD mode is selected than when the CS mode is selected.

5 Claims, 11 Drawing Sheets

(56) References Cited

U.S. PATENT DOCUMENTS

| | | | | |
|---|---|---|---|---|
| 2011/0202223 A1* | 8/2011 | Nefcy | ............... | B60K 6/445 701/22 |
| 2013/0024063 A1* | 1/2013 | Yamamoto | ............ | B60W 10/06 701/22 |
| 2013/0030633 A1* | 1/2013 | Yamamoto | ............ | B60W 10/08 701/22 |
| 2013/0030634 A1* | 1/2013 | Endo | ................... | B60K 6/46 701/22 |
| 2013/0041543 A1* | 2/2013 | Takayanagi | ............ | B60K 6/445 701/22 |
| 2014/0371963 A1* | 12/2014 | Yamamoto | ............ | B60W 10/06 701/22 |
| 2016/0001767 A1* | 1/2016 | Hisano | ................ | B60W 20/15 180/65.25 |

\* cited by examiner

HYBRID VEHICLE

INCORPORATION BY REFERENCE

The disclosure of Japanese Patent Application No. 2014-257651 filed on Dec. 19, 2014 including the specification, drawings and abstract is incorporated herein by reference in its entirety.

BACKGROUND

1. Technical Field

This invention relates to a hybrid vehicle, and more specifically, to a hybrid vehicle that is equipped with an internal combustion engine, an electrical storage device, and an electric motor that generates a running driving force upon being supplied with an electric power from the electrical storage device.

2. Background

Japanese Patent Application Publication No. 2013-252853 (JP 2013-252853 A) discloses a hybrid vehicle having a charge depleting (CD) mode and a charge sustaining (CS) mode. The CD mode is a mode in which the state of charge (the SOC) of an electrical storage device is actively consumed by mainly carrying out EV running while permitting HV running. The CS mode is a mode in which the SOC is controlled to a predetermined range by appropriately making a changeover between HV running and EV running. Incidentally, during EV running, the hybrid vehicle runs using only a motor-generator with an engine stopped. During HV running, the hybrid vehicle runs with the engine in operation. Then, it is described that the threshold of a power at which the engine starts is made larger in the CD mode than in the CS mode (see Japanese Patent Application Publication No. 2013-252853 (JP 2013-252853 A)).

With the hybrid vehicle described in the aforementioned Japanese Patent Application Publication No. 2013-252853 (JP 2013-252853 A), a difference between running at the time of the CD mode and running at the time of the CS mode is realized by changing the number of opportunities for EV running depending on whether the CD mode or the CS mode is selected. That is, with the aforementioned hybrid vehicle, the number of opportunities for EV running is increased by making the threshold of the power at which the engine starts larger at the time of the CD mode than at the time of the CS mode. Thus, the difference between running at the time of the CD mode and running at the time of the CS mode is realized.

On the other hand, owing to a progress in the technology of power electronics, the performances of a motor, an inverter, the electrical storage device and the like are improved, so the output of the motor can be increased. Due partly to this technical background, the degree of freedom in selecting driving force sources (the engine and the motor) is high in the hybrid vehicle. In the hybrid vehicle having the CD mode and the CS mode, it has been desired to realize special running that makes users feel highly satisfied especially in the CD mode.

SUMMARY

This disclose describes a hybrid vehicle capable of realizing special running in a CD mode.

In some embodiments, a hybrid vehicle may include an internal combustion engine, an electrical storage device, an electric motor, and at least one electronic control unit. The electric motor may generate a running driving force upon being supplied with an electric power from the electrical storage device. The electronic control unit may be configured to i) select one of a charge depleting mode and a charge sustaining mode, and ii) cause the hybrid vehicle to run while making a changeover between a first running mode and a second running mode in accordance with a running situation of the hybrid vehicle in each of the charge depleting mode and the charge sustaining mode. The first running mode may be a mode in which the hybrid vehicle runs by the electric motor with the internal combustion engine stopped. The second running mode may be a mode in which the hybrid vehicle runs with the internal combustion engine in operation. A threshold of a power at which a changeover from the first running mode to the second running mode may be made at a time when the charge depleting mode is selected is larger than the threshold at a time when the charge sustaining mode is selected. Also, the electronic control unit may be configured to iii) change driving force characteristics of the hybrid vehicle such that a driving torque of the hybrid vehicle for a same vehicle speed and a same accelerator opening degree at the time when the charge depleting mode is selected is larger than the driving torque for the same vehicle speed and the same accelerator opening degree at the time when the charge sustaining mode is selected.

In this hybrid vehicle, the number of opportunities for EV running in the CD mode may be increased by setting the threshold as described above. On top of that, with this hybrid vehicle, the acceleration performance of EV running in the CD mode may be enhanced by changing the driving force characteristics of the vehicle as described above depending on whether the CD) mode or the CS mode is selected. In consequence, according to this hybrid vehicle, a strong feeling of acceleration can be obtained in EV running while increasing the number opportunities for EV running in the CD mode, and special running in the CD mode can be realized.

In some embodiments, the electronic control unit may be configured to change the driving force characteristics of the hybrid vehicle such that a falling rate of the driving torque corresponding to an increase in vehicle speed at the same accelerator opening degree at the time when the charge depleting mode is selected is smaller than a falling rate of the driving torque corresponding to an increase in vehicle speed at the same accelerator opening degree at the time when the charge sustaining mode is selected, in a range where the driving torque of the hybrid vehicle is below a predetermined upper limit.

In this hybrid vehicle, when the CD mode is selected, the fall in the vehicle driving torque corresponding to the increase in vehicle speed is small, so a feeling of extension of acceleration can be obtained. In consequence, according to this hybrid vehicle, special running in the CD mode may be realized.

In some embodiments, the hybrid vehicle may include an input device configured to select a driving priority mode that realizes running with higher priority given to acceleration performance or responsiveness of the vehicle than to reduction in fuel consumption. The electronic control unit may be configured to change the driving force characteristics of the hybrid vehicle such that the driving torque of the hybrid vehicle for the same vehicle speed and the same accelerator opening degree at the time when i) the charge depleting mode is selected and ii) the driving priority mode is selected is larger than the driving torque of the hybrid vehicle for the same vehicle speed and the same accelerator opening degree at the time when i) the charge depleting mode is selected and ii) the driving priority mode is not selected.

According to this hybrid vehicle, in the CD mode, a stronger feeling of acceleration may be realized in EV running while increasing the number of opportunities for EV running, by selecting the driving priority mode in the CD mode. Incidentally, the driving priority mode may include a mode that realizes running with higher priority given to responsiveness of the vehicle than to reduction in fuel consumption, and the like, as well as a power mode that realizes running with higher priority given to acceleration performance of the vehicle than to reduction in fuel consumption.

In some embodiments, the hybrid vehicle may include an input device configured to select an economy mode that realizes running with higher priority given to reduction in fuel consumption than to acceleration performance of the hybrid vehicle. The electronic control unit may be configured to change the driving force characteristics of the hybrid vehicle such that the driving torque of the hybrid vehicle for the same vehicle speed and the same accelerator opening degree at the time when i) the charge depleting mode is selected and ii) the economy mode is selected is smaller than the driving torque of the hybrid vehicle for the same vehicle speed and the same accelerator opening degree at the time when i) the charge depleting mode is selected and ii) the economy mode is not selected.

According to this hybrid vehicle, in the CD) mode, energy-saving running that is conscious of fuel consumption with a suppressed feeling of acceleration may be realized by selecting the economy mode in the CD mode.

In some embodiments, the hybrid vehicle may include a charging mechanism configured to charge the electrical storage device through a use of an electric power from an electric power supply outside the vehicle.

According to this hybrid vehicle, a strong feeling of acceleration may be realized in EV running while improving fuel economy in the CD) mode through the use of the electric power supplied from the electric power supply outside the vehicle.

In some embodiments of this disclosure, the hybrid vehicle that can realize special running in the CD mode may be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a flowchart for illustrating a processing procedure that is executed by an ECU in some embodiments of the disclosure to calculate a vehicle driving torque (a required value);

DETAILED DESCRIPTION OF EMBODIMENTS

Figure 1:
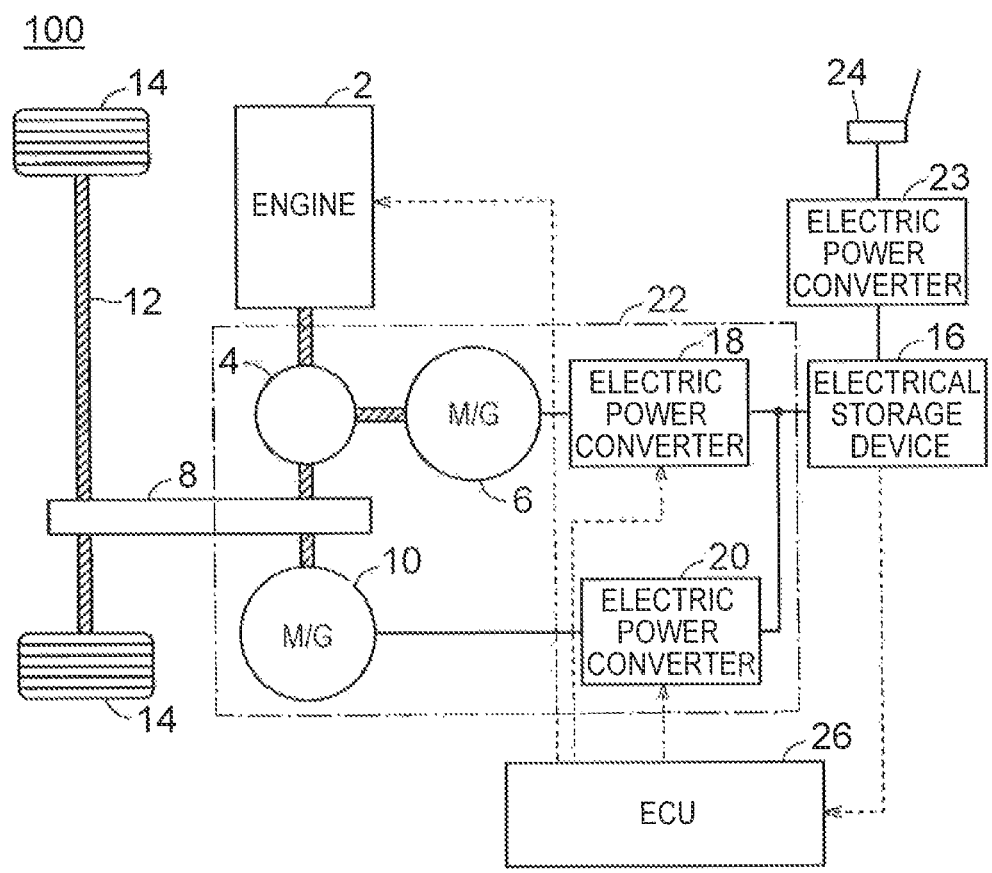
FIG. 1 is a block diagram illustrating an overall configuration of a hybrid vehicle according to the first embodiment of this disclosure.

The embodiments of the disclosure will be described hereinafter in detail with reference to the drawings. Although a plurality of the embodiments of the disclosure will be described hereinafter, appropriate combinations of the configurations described in the respective embodiments of the disclosure have been presupposed since the date of the filing of this application. Incidentally, like or equivalent components in the drawings are denoted by the same reference symbols respectively, and the description thereof will not be repeated.

FIG. 1 is a block diagram for illustrating an overall configuration of a hybrid vehicle according to some embodiments. Referring to FIG. 1, a hybrid vehicle 100 is equipped with an engine 2, a drive 22, a transmission gear 8, a drive shaft 12, wheels 14, an electrical storage device 16, and an electronic control unit (an ECU) 26. Besides, this hybrid vehicle 100 is further equipped with an electric power converter 23 and a connection portion 24.

The engine 2 is an internal combustion engine that outputs a motive power by converting thermal energy resulting from the combustion of fuel into kinetic energy of a kinetic element such as a piston, a rotor or the like. Hydrocarbon-based fuels such as gasoline, light oil, ethanol, liquid hydrogen, natural gas and the like, or liquid or gaseous hydrogen fuels are preferred as the fuel of the engine 2.

The drive 22 includes a motive power split device 4, motor-generators 6 and 10, and electric power converters 18 and 20. The motor-generators 6 and 10 are alternating-current rotating electrical machines, for example, three-phase alternating-current synchronous electric motors each having a permanent magnet embedded in a rotor. The motor-generator 6 is used as a generator that is driven by the engine 2 via the motive power split device 4, and is also used as an electric motor for starting the engine 2. The motor-generator 10 mainly operates as an electric motor, and drives the drive shaft 12. On the other hand, when the vehicle is braked or decelerated on a downward slope, the motor-generator 10 operates as a generator to carry out regenerative electric power generation.

The motive power split device 4 includes, for example, a planetary gear mechanism having three rotary shafts, namely, a sun gear, a carrier, and a ring gear. The motive power split device 4 splits a driving force of the engine 2 into a motive power transmitted to a rotary shaft of the motor-generator 6, and a motive power transmitted to the transmission gear 8. The transmission gear 8 is coupled to the drive shaft 12 for driving the wheels 14. Besides, the transmission gear 8 is coupled to a rotary shaft of the motor-generator 10 as well.

The electrical storage device 16 is a rechargeable direct-current electric power supply, and is configured to include, for example, a secondary battery such as a nickel hydride battery, a lithium-ion battery or the like, a large-capacity capacitor, and the like. The electrical storage device 16 supplies an electric power to the electric power converters 18 and 20. Besides, the electrical storage device 16 is charged upon receiving a generated electric power at the time of electric power generation of the motor-generator 6 and/or the motor-generator 10. Furthermore, the electrical storage device 16 can be charged upon receiving an electric power supplied from an electric power supply outside the vehicle through the connection portion 24.

Incidentally, the charging state of the electrical storage device 16 is indicated by, for example, the state of charge (the SOC), which expresses the ratio of the current electrical storage amount to a fully charged state of the electrical storage device 16 in percentage. The SOC is calculated based on, for example, an output voltage and/or an input/output current of the electrical storage device 16, which are/is detected by a voltage sensor (not shown) and/or a current sensor (not shown). The SOC may be calculated by an ECU that is separately provided for the electrical storage device 16, or by the ECU 26 based on detected values and/or a detected value of the output voltage and/or the input/output current of the electrical storage device 16.

The electric power converter 18 carries out bidirectional direct-current/alternating-current electric power conversion between the motor-generator 6 and the electrical storage device 16, based on a control signal received from the ECU 26. By the same token, the electric power converter 20 carries out bidirectional direct-current/alternating-current electric power conversion between the motor-generator 10 and the electrical storage device 16, based on a control signal received from the ECU 26. Thus, while exchanging an electric power with the electrical storage device 16, the motor-generators 6 and 10 can output a positive torque for operating as an electric motor or a negative torque for operating as a generator. The electric power converters 18 and 20 are constituted by, for example, inverters. Incidentally, a step-up converter for direct-current voltage conversion can also be arranged between the electrical storage device 16 and the electric power converters 18 and 20.

The electric power converter 23 converts an electric power from an external electric power supply (not shown) outside the vehicle, which is electrically connected to the connection portion 24, into a voltage level of the electrical storage device 16, and outputs it to the electrical storage device 16 (charging of the electrical storage device 16 by the external electric power supply will be referred to hereinafter as "external charging" as well). The electric power converter 23 is configured to include, for example, a commutator or an inverter. Incidentally, the method of electric power reception of the external electric power supply is not limited to contact electric power reception through the use of the connection portion 24. Electric power may also be received in a non-contact manner from the external electric power supply, using a coil for electric power reception or the like instead of the connection portion 24.

The ECU 26 includes a central processing unit (a CPU) (not shown), a storage device (not shown), an input/output buffer (not shown), and the like, and controls various components in the hybrid vehicle 100. Incidentally, the control of these components is not required to be processed by software, but can also be processed by a dedicated piece of hardware (an electronic circuit). Disclosed embodiments may also be carried out through the use of a plurality of ECUs.

As main control of the ECU 26, the ECU 26 calculates a vehicle driving torque (a required value) based on a vehicle speed and an accelerator opening degree corresponding to an operation amount of an accelerator pedal, and calculates a vehicle driving power (a required value) based on the calculated vehicle driving torque. Then, the ECU 26 further calculates a charging required power of the electrical storage device 16 based on an SOC of the electrical storage device 16, and controls the engine 2 and the drive 22 such that a power that is obtained by adding the charging required power to the vehicle driving power (hereinafter referred to as "a vehicle power") is generated.

When the vehicle power is small, the ECU 26 controls the drive 22 such that the vehicle runs only by the motor-generator 10 with the engine 2 stopped (EV running). When the vehicle power increases, the ECU 26 controls the engine 2 and the drive 22 such that the vehicle runs with the engine 2 in operation (HV running).

It should be noted herein that the ECU 26 executes running control for controlling the running of the vehicle by selectively applying the CD mode in which the SOC of the electrical storage device 16 is actively consumed by mainly carrying out EV running while permitting HV running, and the CS mode in which the SOC is controlled to the predetermined range by appropriately making a changeover between HV running and EV running.

Figure 2:
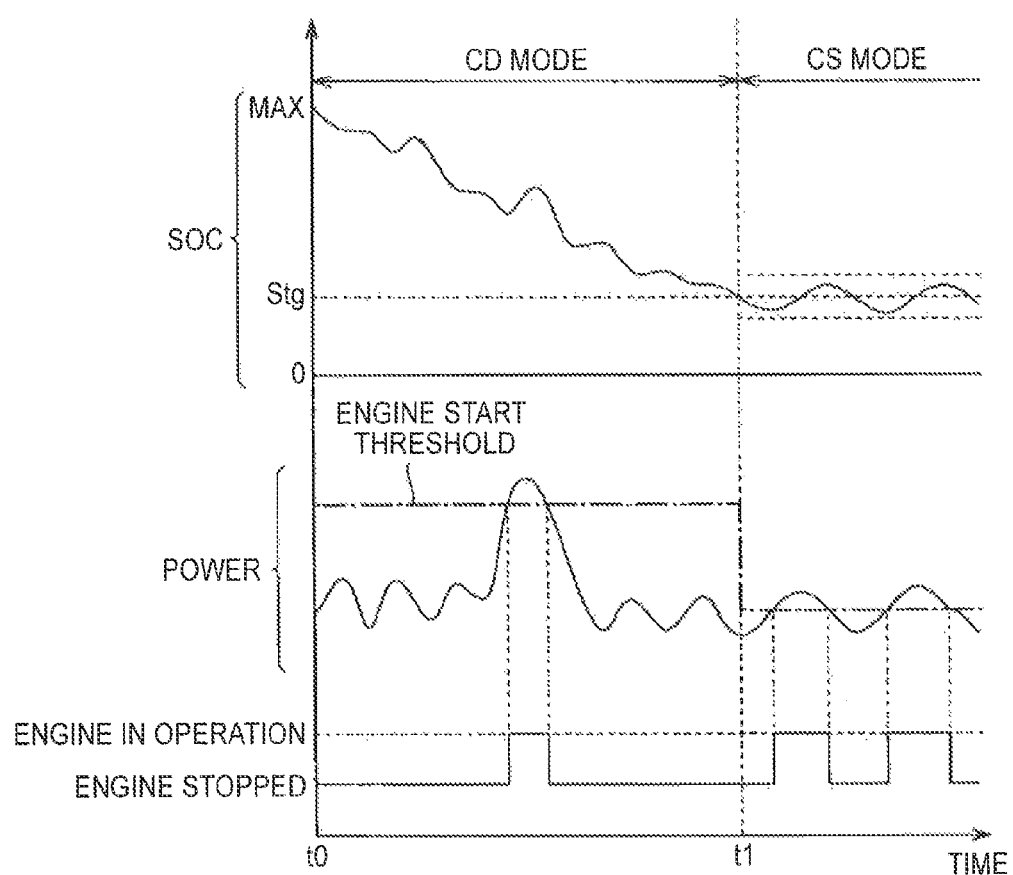
FIG. 2 is a view for illustrating a CD mode and a CS mode.

FIG. 2 is a view for illustrating the CD mode and the CS mode. Referring to FIG. 2, it is assumed that the vehicle starts running in the CD mode after the electrical storage device 16 is fully charged (SOC=MAX) through external charging by the external electric power supply.

The CD mode is a mode in which the SOC of the electrical storage device 16 is actively consumed. In the CD mode, the electric power stored in the electrical storage device 16 (mainly the electric energy resulting from external charging) is basically consumed. During running in the CD mode, the engine 2 does not operate to maintain the SOC. Concretely, for example, when the CD mode is selected, the charging required power of the electrical storage device 16 is set to zero. Thus, although the SOC may temporarily increase due to the regenerative electric power recovered at the time of deceleration of the vehicle or the like or the electric power generated as a result of operation of the engine 2, the ratio of discharge ends up being larger than the ratio of charge. On the whole, the SOC decreases as the running distance increases.

The CS mode is a mode in which the SOC of the electrical storage device 16 is controlled to a predetermined range. As an example, when the SOC falls to a predetermined value Stg indicating a fall in the SOC at a time t1, the CS mode is selected, and the SOC is thereafter held in the predetermined range. Concretely, the engine 2 operates (HV running) when the SOC falls, and the engine 2 stops (EV running) when the SOC rises. That is, in the CS mode, the engine 2 operates to maintain the SOC. Incidentally, although not shown in particular, a switch that can be manipulated by a driver may be provided, and a changeover between the CD mode and the CS mode may be made based on the intention of the driver regardless of a fall in the SOC.

With this hybrid vehicle 100, when the vehicle power is smaller than a predetermined engine start threshold, the hybrid vehicle runs by the motor-generator 10 with the engine 2 stopped (EV running). On the other hand, when the vehicle power exceeds the aforementioned engine start threshold, the hybrid vehicle runs with the engine 2 in operation (HV running). With HV running, the hybrid vehicle 100 runs using the driving force of the engine 2 in addition to or instead of the driving force of the motor-generator 10. The electric power generated by the motor-generator 6 as a result of operation of the engine 2 during HV running is directly supplied to the motor-generator 10, or stored into the electrical storage device 16.

It should be noted herein that the engine start threshold in the CD mode is larger than the engine start threshold in the CS mode. That is, the region in which the hybrid vehicle 100 carries out EV running in the CD mode is larger than the region in which the hybrid vehicle 100 carries out EV running in the CS mode. Thus, in the CD mode, the frequency with which the engine 2 starts is suppressed, and the number of opportunities for EV running is larger than in the CS mode. On the other hand, in the CS mode, control is executed such that the hybrid vehicle 100 efficiently runs using both the engine 2 and the motor-generator 10.

In the CD mode as well, when the vehicle power (which is equal to the vehicle driving power) exceeds an engine start threshold, the engine 2 operates. Incidentally, even when the vehicle power has not exceeded the engine start threshold, the engine 2 is permitted to operate in some cases, for example, when the engine 2 or an exhaust catalyst is warmed up. On the other hand, in the CS mode as well, when the SOC rises, the engine 2 stops. That is, the CD mode is not limited to EV running in which the vehicle runs with the engine 2 constantly stopped, and the CS mode is not limited either to HV running in which the vehicle runs with the engine 2 constantly in operation. In both the CD mode and the CS mode, EV running and HIV running are possible.

Referring again to FIG. 1, the ECU 26 changes the driving force characteristics of the vehicle depending on whether the CD mode or the CS mode is selected, such that the vehicle driving torque for the same vehicle speed and the same accelerator opening degree is larger when the CD mode is selected than when the CS mode is selected. Thus, in the CD mode, a strong feeling of acceleration can be obtained in EV running while increasing the number of opportunities for EV running, and special running in the CD mode can be realized. This point will be described hereinafter in detail.

Figure 3:
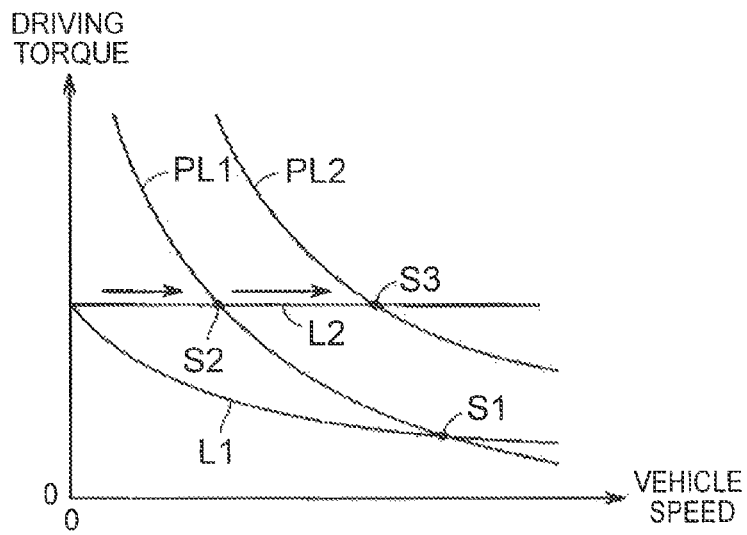
FIG. 3 is a view for illustrating how to interpret driving force characteristics in each of the CS mode and the CD mode.

FIG. 3 is a view for illustrating how to interpret driving force characteristics in each of the CS mode and the CD mode. Referring to FIG. 3, the axis of abscissa represents the vehicle speed, and the axis of ordinate represents the driving torque of the vehicle. A curve PL1 indicates a start threshold of the engine 2 (an iso-power line) at the time when the CS mode is selected, and a curve PL2 indicates a start threshold of the engine 2 (an iso-power line) at the time when the CD mode is selected. As described above, the start power threshold of the engine 2 at the time when the CD mode is selected is larger than the start power threshold at the time when the CS mode is selected.

A line L1 indicates driving force characteristics of the vehicle at the time when the accelerator opening degree is X %, in the case where the CS mode is selected. That is, when the accelerator opening degree is X % in the case where the CS mode is selected, the vehicle driving torque (the required value) is determined according to this line L1.

A line L2 indicates driving force characteristics of the vehicle at the time when the accelerator opening degree is X % in the case where the CD mode is selected. That is, when the accelerator opening degree is X % in the case where the CD mode is selected, the vehicle driving torque (the required value) is determined according to this line L2.

Incidentally, the driving force characteristics at the time when the accelerator opening degree is X % are not limited to those indicated by the lines L1 and L2. However, with the hybrid vehicle 100 according to some embodiments, the driving force characteristics are changed depending on whether the CD mode or the CS mode is selected, such that the vehicle driving torque for the same vehicle speed and the same accelerator opening degree is larger when the CD mode is selected than when the CS mode is selected.

When the CS mode is selected, the driving force characteristics are set such that the engine 2 does not start until reaching an operating point indicated by a point S1, by suppressing the driving torque as the vehicle speed increases as indicated by the line L1. When driving force characteristics for increasing the driving torque to an extent indicated by the line L2 are set for the purpose of obtaining a strong feeling of acceleration in EV running, the engine 2 starts early at an operating point indicated by a point S2, and the number of opportunities for EV running significantly decreases.

On the other hand, the start power threshold of the engine 2 at the time when the CD mode is selected is larger than the start power threshold at the time when the CS mode is selected, as described above. Concretely, the engine 2 does not start until the vehicle power (the vehicle driving power) reaches a line indicated by the curve PL2. Thus, with the hybrid vehicle 100 according to some embodiments, the driving force characteristics are set such that the vehicle driving torque for the same vehicle speed and the same accelerator opening degree is larger when the CD mode is selected than when the CS mode is selected, as indicated by the line L2. Even if the driving force characteristics according to the line L2 are assigned when the CD mode is selected, the engine 2 does not start until reaching an operating point indicated by a point 33. Thus, when the CD mode is selected, a strong acceleration torque in EV running along the line L2 can be realized while increasing the number of opportunities for EV running (the point S2→the point S3).

Figure 4:
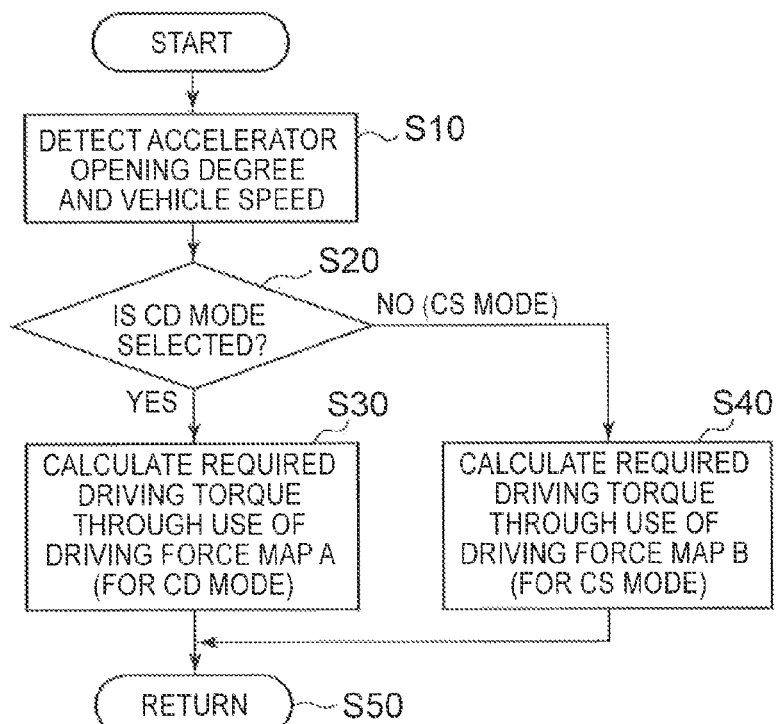
FIG. 4 is a flowchart for illustrating a processing procedure that is executed by an ECU to calculate a vehicle driving torque (a required value)

FIG. 4 is a flowchart for illustrating a processing procedure that is executed by the ECU 26 shown in FIG. 1 to calculate a vehicle driving torque (a required value). Incidentally, the processing shown in this flowchart is called out from a main routine to be executed, at intervals of a predetermined time or upon fulfillment of a predetermined condition.

Referring to FIG. 4, the ECU 26 receives detected values of an accelerator opening degree and a vehicle speed (step S10). Incidentally, the accelerator opening degree is detected by an accelerator opening degree sensor (not shown), and the vehicle speed is detected by a vehicle speed sensor that detects a vehicle speed by, for example, detecting a rotational speed of an axle.

Subsequently, the ECU 26 determines whether or not the CD mode is selected (step S20). Incidentally, it is also appropriate herein to determine whether or not the CS mode is selected. Then, if it is determined in step S20 that the CD mode is selected (YES in step S20), the ECU 26 calculates a required driving torque of the vehicle based on the accelerator opening degree detected in step S10 and the vehicle speed detected in step S10, through the use of a driving force map A for the CD mode (which will be described later) (step S30).

On the other hand, if it is determined in step S20 that the CS mode is selected (NO in step S20), the ECU 26 calculates a required driving torque based on the accelerator opening degree detected in step S10 and the vehicle speed detected in step S10, through the use of a driving force map B for the CS mode (which will be described later) (step S40).

Figure 5:
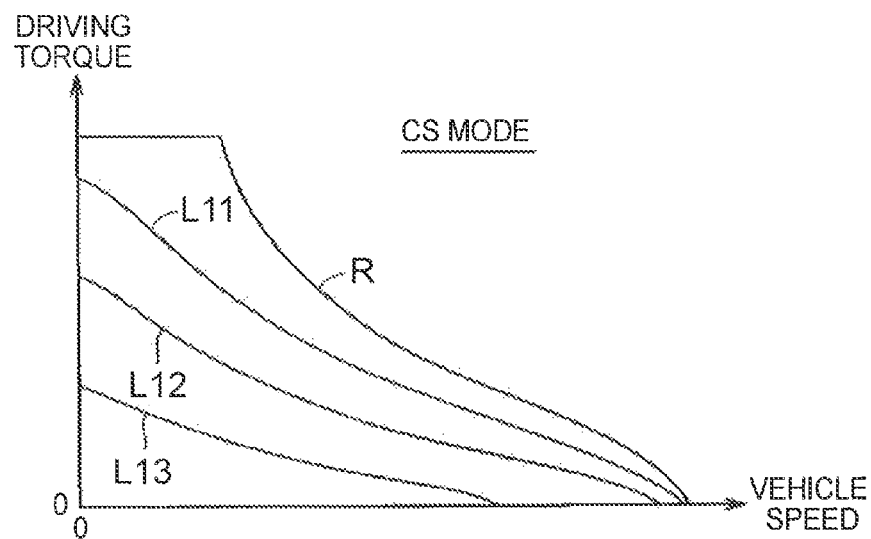
FIG. 5 is a view showing an exemplary driving force map for the CS mode.

FIG. 5 is a view showing an exemplary driving force map B for the CS mode. Referring to FIG. 5, the axis of abscissa represents the vehicle speed, and the axis of ordinate represents the driving torque of the vehicle. A line R indicates a rated output line. A line L11 indicates driving force characteristics of the vehicle at the time when the accelerator opening degree is X1%. Lines L12 and L13 indicate driving force characteristics at the time when the accelerator opening degree is X2% and X3% (X1>X2>X3), respectively. Incidentally, no driving force characteristics are shown unless the accelerator opening degree is X1%, X2% or X3%. However, the line indicating driving force characteristics shifts rightward and upward in the drawing, as the accelerator opening degree increases.

Figure 6:
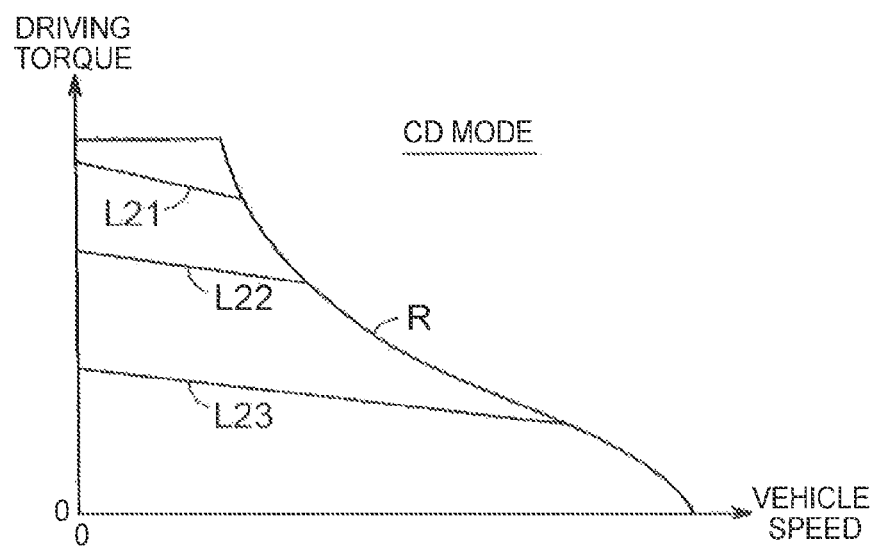
FIG. 6 is a view showing an exemplary driving force map for the CD mode.

On the other hand, FIG. 6 is a view showing an exemplary driving force map A for the CD mode. This FIG. 6 corresponds to FIG. 5. Referring to FIG. 6, a line L21 indicates driving force characteristics of the vehicle at the time when the accelerator opening degree is X1%. Lines L22 and L23 indicate driving force characteristics at the time when the accelerator opening degree is X2% and X3%, respectively.

Referring to FIGS. 5 and 6, as is apparent from contrasts at the same accelerator opening degree (a contrast between the line L11 and the line l21, a contrast between the line L12 and the line L22, and a contrast between the line L13 and the line L23), the driving force characteristics of the vehicle are changed depending on whether the CD mode or the CS mode is selected, such that the vehicle driving torque for the same vehicle speed and the same accelerator opening degree is larger when the CD mode is selected (FIG. 6) than when the CS mode is selected (FIG. 5). Thus, in the CD mode, a strong feeling of acceleration can be obtained in EV running while increasing the number of opportunities for EV running.

Incidentally, as shown in FIGS. 5 and 6, it is preferable to change the driving force characteristics depending on whether the CD mode or the CS mode is selected, such that the fail in vehicle driving torque corresponding to the increase in vehicle speed at the same accelerator opening degree is smaller when the CD mode is selected (FIG. 6) than when the CS mode is selected (FIG. 5) in a range where the vehicle driving torque is below the rated output line R. Concretely, for example, as for the contrast between the line L12 (the CS mode) and the line L22 (the CD mode) at the same accelerator opening degree, the gradient of the line L22 in the CD mode (the degree of fall in vehicle driving torque corresponding to the increase in vehicle speed) is smaller than the gradient of the line L12 in the CS mode. Thus, a stronger feeling of extension of acceleration (a feeling of maintenance of the driving force with respect to the increase in vehicle speed) is obtained when the CD mode is selected than when the CS mode is selected.

As described above, in some embodiments, the engine start threshold in the CD mode is larger than the engine start threshold in the CS mode, and the number of opportunities for EV running in the CD mode is increased. On top of that, the acceleration performance of EV running in the CD mode is enhanced by changing the driving force characteristics of the vehicle as described above depending on whether the CD) mode or the CS mode is selected. In consequence, according to some embodiments, a strong feeling of acceleration can be obtained in EV running while increasing the number of opportunities for EV running in the CD mode, and special running in the CD mode can be realized.

In some embodiments, a power mode switch that can be manipulated by a user is provided. When the power mode switch is manipulated to be turned on, a power mode that realizes running with higher priority given to acceleration performance of the vehicle than to reduction in fuel consumption is selected, and the acceleration performance of the vehicle can be made higher than when the power mode switch is not manipulated (at the time of a normal mode). This power mode switch can be manipulated during both the CD mode and the CS mode.

Figure 7:
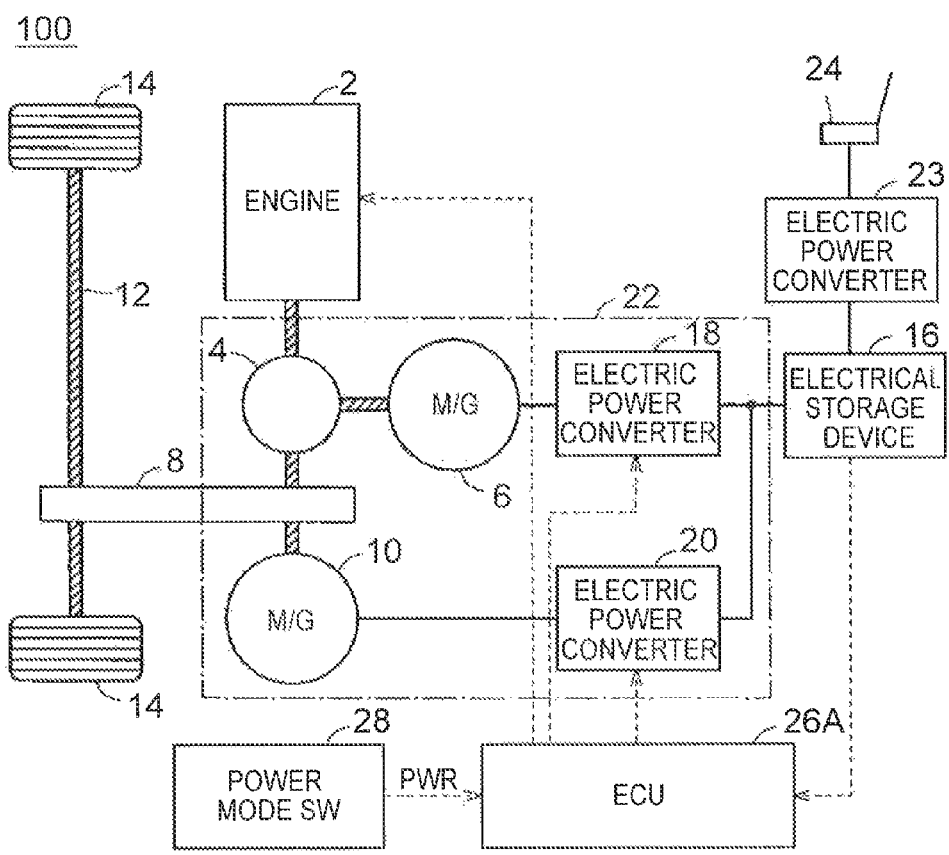
FIG. 7 is a block diagram illustrating an overall configuration of a hybrid vehicle according to some embodiments of the disclosure.

FIG. 7 is a block diagram for illustrating an overall configuration of a hybrid vehicle according to some embodiments. Referring to FIG. 7, the hybrid vehicle 100 according to th some embodiments is further equipped with a power mode switch 28, and is equipped with an ECU 26A instead of the ECU 26, in the configuration of the hybrid vehicle 100 shown in FIG. 1.

The power mode switch 28 is an input switch for allowing the user to select the power mode that realizes running with higher priority given to acceleration performance of the vehicle than to reduction in fuel consumption. The power mode switch 28 outputs a signal PWR to the ECU 26A in response to the user's manipulation of turning on the switch.

The ECU 26A changes the driving force characteristics of the vehicle depending on whether the power mode is selected or not selected (at the time of the normal mode), such that the vehicle driving torque for the same vehicle speed and the same accelerator opening degree is larger when the power mode is selected than when the power mode is not selected in the normal mode.

More specifically, when the power mode is selected during selection of the CD mode, the ECU 26A changes the driving force characteristics such that the vehicle driving torque for the same vehicle speed and the same accelerator opening degree is still larger than in the case of the driving force characteristics shown in FIG. 6 (in the CD mode and at the time of the normal mode). Thus, a stronger feeling of acceleration can be realized in EV running while increasing the number of opportunities for EV running, by selecting the power mode in the CD mode.

Besides, when the power mode is selected during selection of the CS mode, the ECU 26A changes the driving force characteristics such that the vehicle driving torque for the same vehicle speed and the same accelerator opening degree is larger than in the case of the driving force characteristics shown in FIG. 5 (in the CS mode and at the time of the normal mode). Incidentally, when the driving torque is increased in the CS mode, the engine 2 starts early (FIG. 2). Therefore, when the frequency with which the engine 2 starts is desired to be suppressed even in the power mode, the increase in the driving torque at the time of selection of the power mode needs to be held equal to a small amount.

Figure 8:
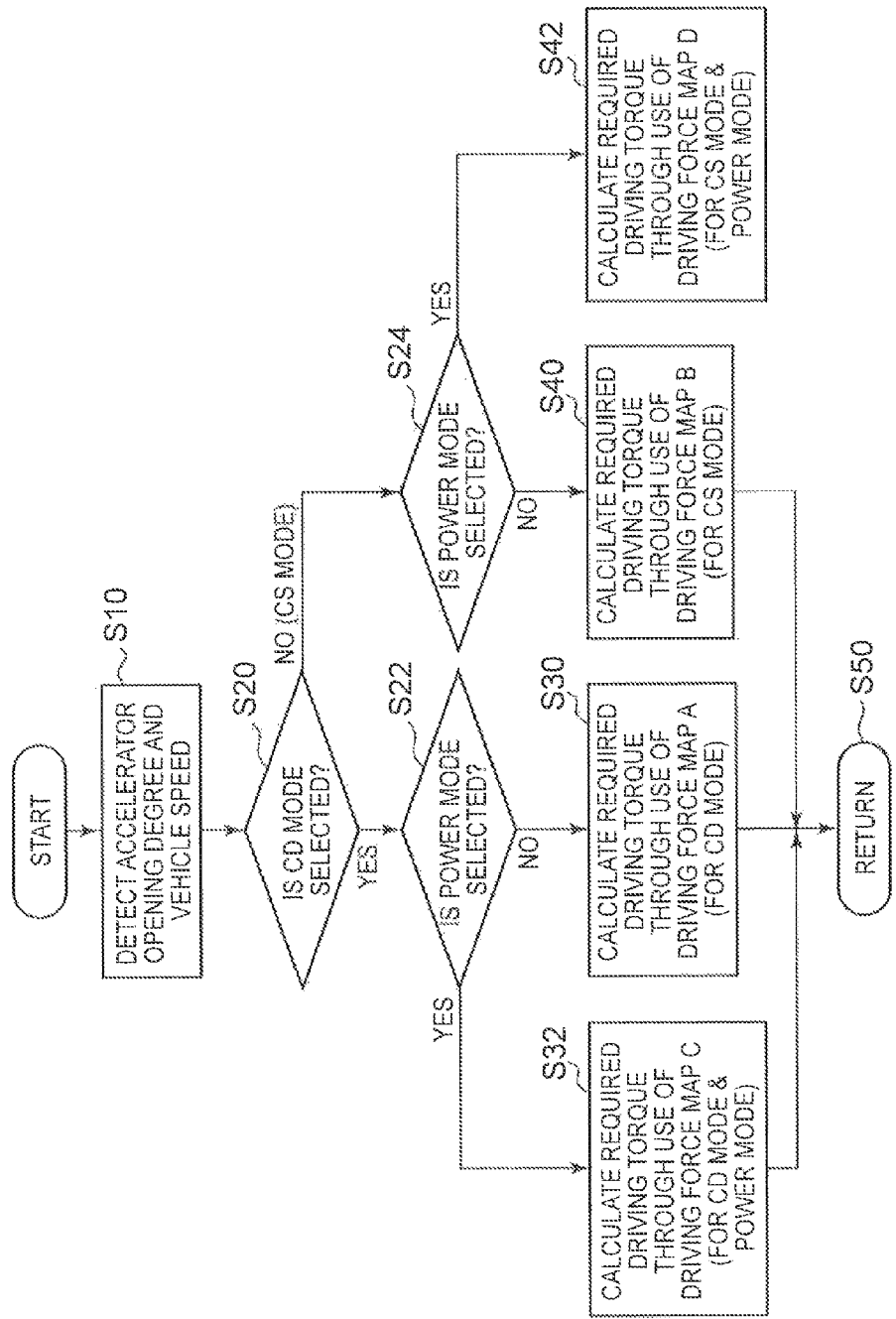
FIG. 8 is a flowchart for illustrating a processing procedure that is executed by an ECU in some embodiments of the disclosure to calculate a vehicle driving torque (a required value)

FIG. 8 is a flowchart for illustrating a processing procedure that is executed by the ECU 26A in some embodiments to calculate a vehicle driving torque (a required value). Incidentally, the processing shown in this flowchart is also called out from a main routine to be executed, at intervals of a predetermined time or upon fulfillment of a predetermined condition.

Referring to FIG. 8, this flowchart further includes steps S22, S24, S32 and S42 in the flowchart of FIG. 4. That is, if it is determined in step S20 that the CD mode is selected (YES in step S20), the ECU 26A determines, based on the signal PWR from the power mode switch 28, whether or not the power mode is selected (step S22).

If it is determined that the power mode is selected (YES in step S22), the ECU 26A calculates a required driving torque of the vehicle based on the accelerator opening degree detected in step S10 and the vehicle speed detected in step S10, through the use of a driving force map C for the CD mode and the power mode (which will be described later) (step S32).

On the other hand, if it is determined in step S22 that the power mode is not selected (NO in step S22), the ECU 26A shifts the processing to step S30, and calculates a required driving torque of the vehicle based on the accelerator opening degree detected in step S1 and the vehicle speed detected in step S10, through the use of the driving force map A for the CD mode (FIG. 6).

Figure 9:
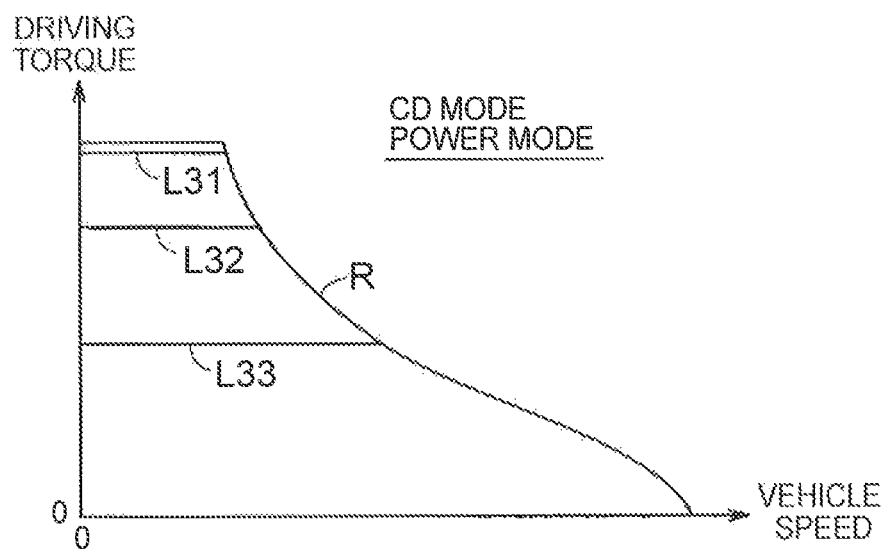
FIG. 9 is a view showing an exemplary driving force map for the CD mode and a power mode.

FIG. 9 is a view showing an exemplary driving force map C for the CD mode and the power mode. This FIG. 9 corresponds to FIG. 6 showing the driving force map for the CD mode and the normal mode. Referring to FIG. 9, a line L31 indicates driving force characteristics of the vehicle at the time when the accelerator opening degree is X1%, and lines L32 and L33 indicate driving force characteristics at the time when the accelerator opening degree is X2% and X3% respectively.

Referring to FIGS. 6 and 9, as is apparent from contrasts at the same accelerator opening degree (a contrast between the line L21 and the line L31, a contrast between the line L22 and the line L32, and a contrast between the line L23 and the line L33). In the case where the CD mode is selected, the driving force characteristics of the vehicle are changed depending on whether the power mode is selected or not selected (at the time of the normal mode) such that the vehicle driving torque for the same vehicle speed and the same accelerator opening degree is larger when the power mode is selected (FIG. 9) than when the normal mode is selected (FIG. 6).

Referring again to FIG. 8, if it is determined in step S20 that the CS mode is selected (NO in step 320), the ECU 26A determines, based on the signal PWR from the power mode switch 28, whether or not the power mode is selected (step S24).

If it is determined that the power mode is selected (YES in step S24), the ECU 26A calculates a required driving torque of the vehicle based on the accelerator opening degree detected in step S10 and the vehicle speed detected in step S10, through the use of a driving force map D for the CS mode and the power mode (not shown) (step S42). On the other hand, if it is determined in step S24 that the power mode is not selected (NO in step S24), the ECU 26A shifts the processing to step S40, and calculates a required driving torque of the vehicle based on the accelerator opening degree detected in step S10 and the vehicle speed detected in step S10, through the use of the driving force map B for the CS mode (FIG. 5).

Incidentally, in the foregoing, the power mode can be selected during both the CD mode and the CS mode. However, when the power mode is permitted during selection of the CS mode as described above, the engine 2 can start early. Therefore, the power mode may be selected only during selection of the CD mode. In this case, steps S24 and S42 are omitted in the flowchart shown in FIG. 8.

As described above, according to some embodiments, a stronger feeling of acceleration can be realized in EV running while increasing the number of opportunities for EV running, by selecting the power mode in the CD mode.

Incidentally, in the foregoing, the power mode that realizes running with higher priority given to acceleration performance of the vehicle than to reduction in fuel consumption, and the power mode switch 28 for selecting the power mode are provided. However, it is also appropriate to provide a mode that realizes running with higher priority given to responsiveness of the vehicle (responsiveness to the operation of the accelerator) than to reduction in fuel consumption (which may be referred to as "a sports mode" or the like, and which will be referred to hereinafter as "the sport mode"), and a switch for selecting the sport mode.

Then, when the sport mode is selected during selection of the CD mode, the ECU 26A may change the driving force characteristics of the vehicle depending on whether the sport mode is selected or not selected, such that the responsiveness of the vehicle to the operation of the accelerator is higher than when the sport mode is not selected. Incidentally, the responsiveness of the vehicle to the operation of the accelerator can be enhanced by, for example, loosening restrictions on the rate of change in a change rate restriction processing for a driving torque command, or reducing the time constant of a "smoothing" processing (a lag processing) for the driving torque command.

Owing to this configuration, running with excellent responsiveness of the vehicle to the operation of the accelerator can be realized while increasing the number of opportunities for EV running, by selecting the sport mode in the CD mode.

Third Embodiment

In some embodiments, an economy mode switch that can be manipulated by a user is provided. When the economy mode switch is manipulated, an economy mode that realizes running with higher priority given to reduction in fuel consumption than to acceleration performance of the vehicle is selected, and running with lower fuel consumption than when the economy mode switch is not manipulated (at the time of the normal mode) can be realized. This economy mode switch can be manipulated during both the CD mode and the CS mode.

Figure 10:
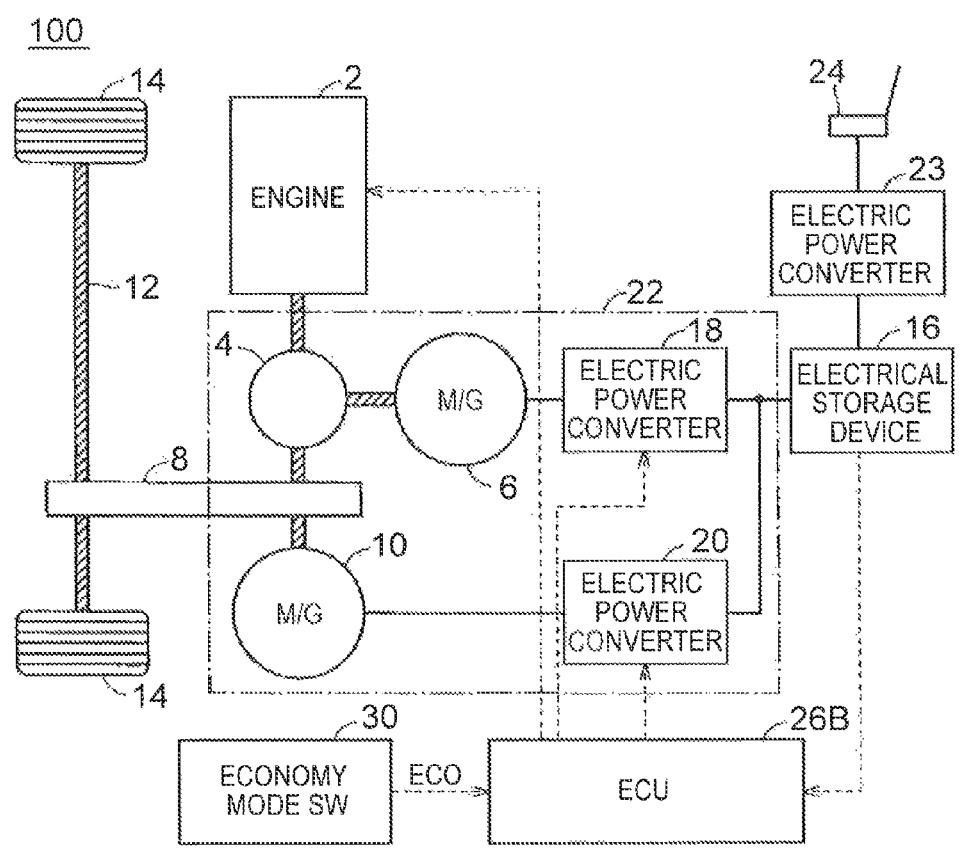
FIG. 10 is a block diagram illustrating an overall configuration of a hybrid vehicle according to some embodiments of the disclosure.

FIG. 10 is a block diagram for illustrating an overall configuration of a hybrid vehicle according to some embodiments. Referring to FIG. 10, the hybrid vehicle 100 according to some embodiments is further equipped with an economy mode switch 30, and is equipped with an ECU 26B instead of the ECU 26, in the configuration of the hybrid vehicle 100 shown in FIG. 1.

The economy mode switch 30 is an input switch for allowing the user to select the economy mode that realizes running with higher priority given to reduction in fuel consumption than to acceleration performance of the vehicle. The economy mode switch 30 outputs a signal ECO to the ECU 26B in response to the user's manipulation of turning on the switch.

The ECU 26B changes the driving force characteristics of the vehicle depending on whether the economy mode is selected or not selected (at the time of the normal mode), such that the vehicle driving torque for the same vehicle speed and the same accelerator opening degree is smaller when the economy mode is selected than when the economy mode is not selected in the normal mode.

More specifically, when the economy mode is selected during selection of the CD mode, the ECU 26B changes the driving force characteristics such that the vehicle driving torque for the same vehicle speed and the same accelerator opening degree is smaller than in the case of the driving force characteristics shown in FIG. 6 (in the CD mode and at the time of the normal mode). Thus, a changeover from EV running to HV running can be further suppressed, and energy-saving running that is conscious of fuel consumption while suppressing a feeling of acceleration can be realized, by selecting the economy mode in the CD mode.

Besides, when the economy mode is selected during selection of the CS mode, the ECU 26B changes the driving force characteristics such that the vehicle driving torque for the same vehicle speed and the same accelerator opening degree is smaller than in the case of the driving force characteristics shown in FIG. 5 (in the CS mode and at the time of the normal mode).

Figure 11:
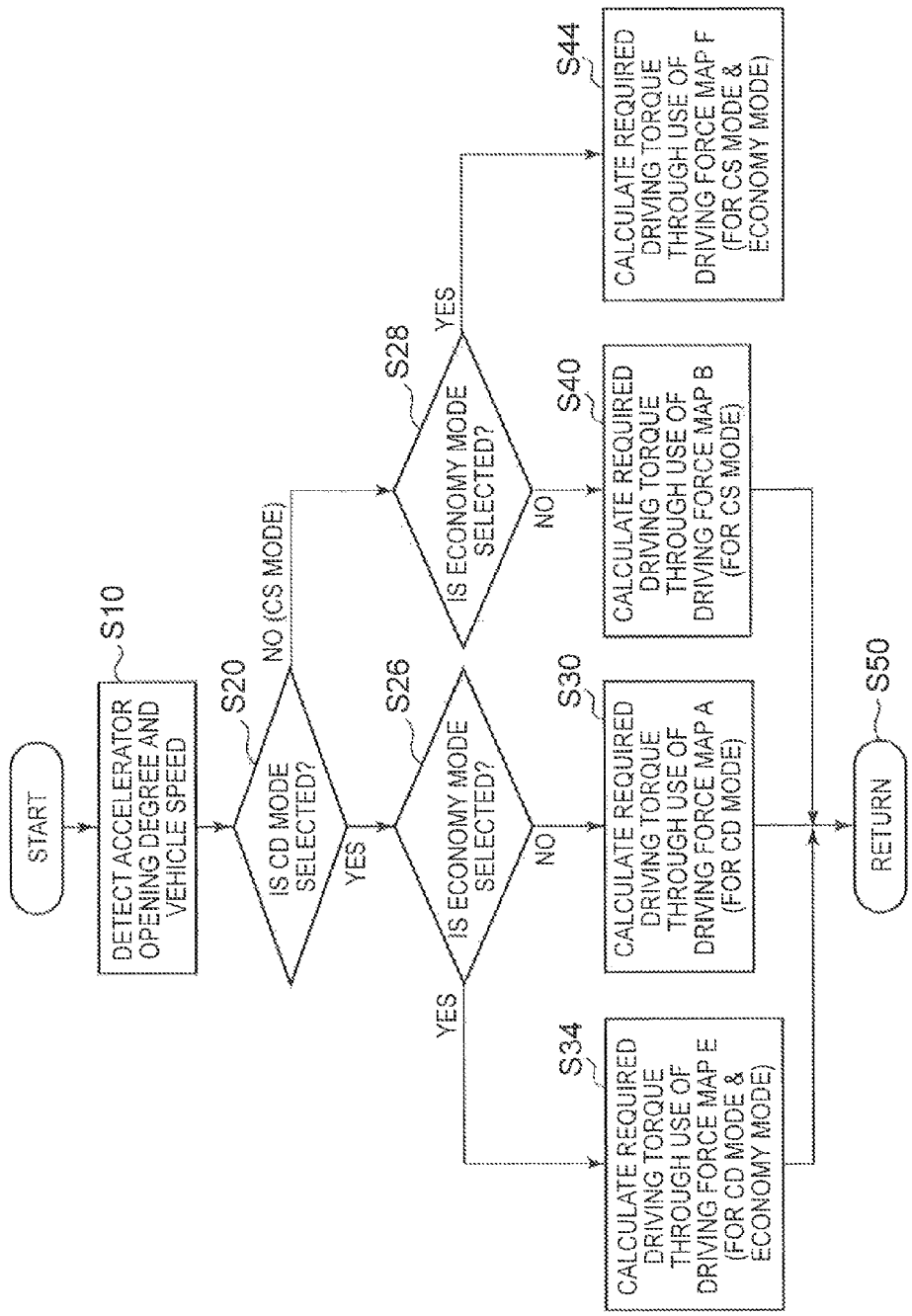

FIG. 11 is a flowchart for illustrating a processing procedure that is executed by the ECU 26B in some embodiments to calculate a vehicle driving torque (a required value). Incidentally, the processing shown in this flowchart is also called out from a main routine to be executed, at intervals of a predetermined time or upon fulfillment of a predetermined condition.

Referring to FIG. 11, this flowchart further includes steps S26, S28, S34 and S44 in the flowchart of FIG. 4. That is, if it is determined in step S20 that the CD mode is selected (YES in step S20), the ECU 26B determines, based on the signal ECO from the economy mode switch 30, whether or not the economy mode is selected (step S26).

If it is determined that the economy mode is selected (YES in step S26), the ECU 26B calculates a required driving torque of the vehicle based on the accelerator opening degree detected in step S10 and the vehicle speed detected in step S10, through the use of a driving force map E for the CD mode and the economy mode (which will be described later) (step S34).

On the other hand, if it is determined in step S26 that the power mode is not selected (NO in step S26), the ECU 26B shifts the processing to step S30, and calculates a required driving torque of the vehicle based on the accelerator opening degree detected in step S10 and the vehicle speed detected in step S10, through the use of the driving force map A for the CD mode (FIG. 6).

Figure 12:
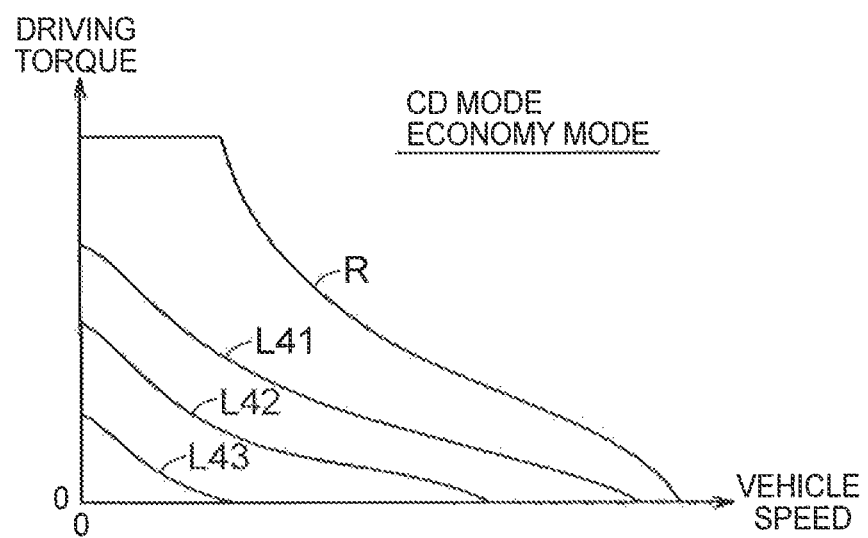
FIG. 12 is a view showing an exemplary driving force map for the CD mode and an economy mode.

FIG. 12 is a view showing an exemplary driving force map E for the CD mode and the economy mode. This FIG. 12 corresponds to FIG. 6 showing the driving force map for the CD mode and the normal mode. Referring to FIG. 12, a line L41 indicates driving force characteristics of the vehicle at the time when the accelerator opening degree is X1%, and lines L42 and L43 indicate driving force characteristics at the time when the accelerator opening degree is X2% and X3%, respectively.

Referring to FIGS. 6 and 12, as is apparent from contrasts at the same accelerator opening degree (a contrast between the line L21 and the line L41, a contrast between the line L22 and the line L42, and a contrast between the line L23 and the line L43), in the case where the CD mode is selected, the driving force characteristics of the vehicle are changed depending on whether the economy mode is selected or not selected (at the time of the normal mode), such that the vehicle driving torque for the same vehicle speed and the same accelerator opening degree is smaller when the economy mode is selected (FIG. 12) than when the normal mode is selected (FIG. 6).

Referring again to FIG. 11, if it is determined in step S20 that the CS mode is selected (NO in step S20), the ECU 26B determines, based on the signal ECO from the economy mode switch 30, whether or not the economy mode is selected (step S28).

If it is determined that the economy mode is selected (YES in step S28), the ECU 26B calculates a required driving torque of the vehicle based on the accelerator opening degree detected in step S10 and the vehicle speed detected in step S10, through the use of a driving force map F for the CS mode and the economy mode (not shown) (step S44). On the other hand, if it is determined in step S28 that the economy mode is not selected (NO in step S28), the ECU 26B shifts the processing to step S40, and calculates a required driving torque of the vehicle based on the accelerator opening degree detected in step S10 and the vehicle speed detected in step S10, through the use of the driving force map B for the CS mode (FIG. 5).

Incidentally, in the foregoing, the economy mode can be selected during both the CD mode and the CS mode. However, according to the driving force characteristics in the CS mode, the driving torque is suppressed even in the normal mode (FIG. 2). Therefore, the economy mode may be selected only during selection of the CD mode. In this case, steps S28 and S44 are omitted in the flowchart shown in FIG. 11.

As described above, according to some embodiments, energy-saving running that is conscious of fuel consumption while suppressing a feeling of acceleration can be realized by selecting the economy mode in the CD mode.

Incidentally, in each of the disclosed embodiments, the control in the hybrid vehicle 100 (FIG. 1) that is configured such that the engine 2 is coupled to the two motor-generators 6 and 10 by the motive power split device 4 has been described. However, the hybrid vehicle to which disclosed embodiments are applied is not limited to this configuration.

Figure 13:
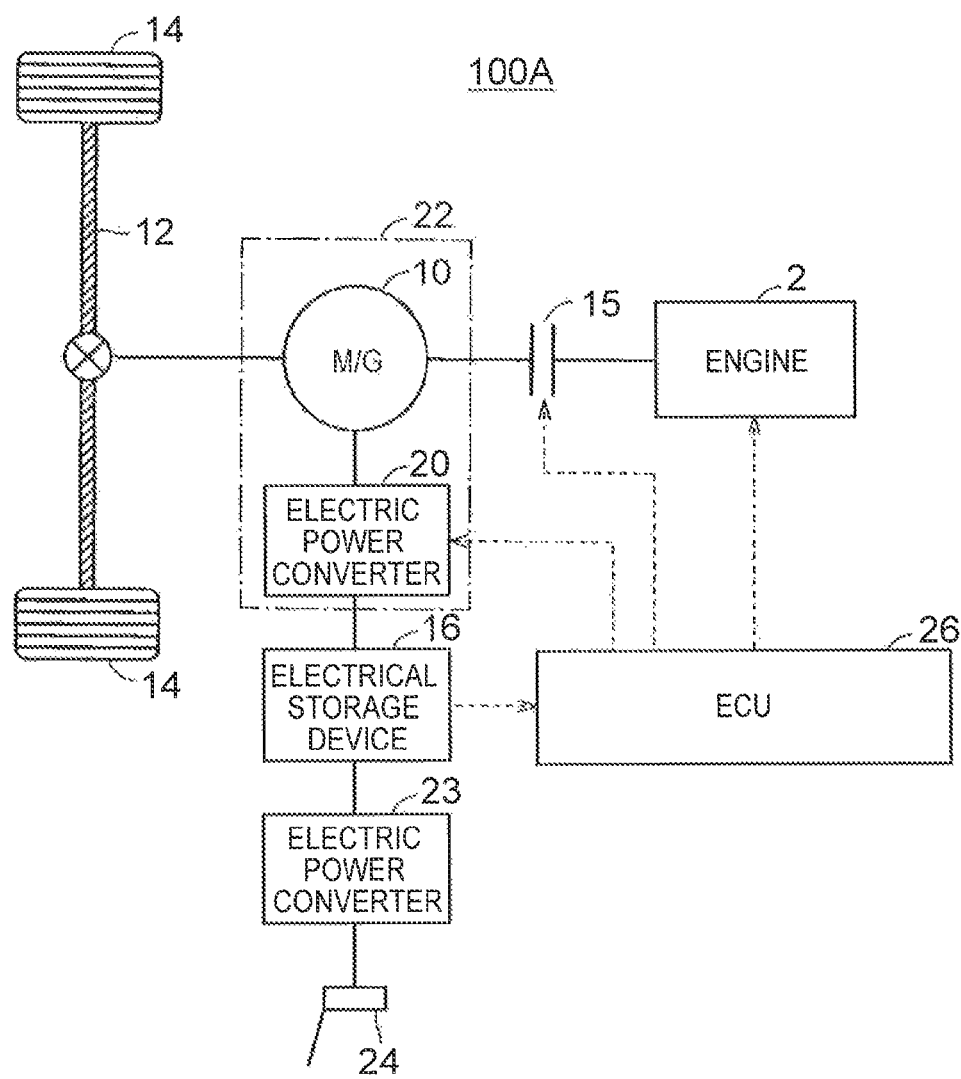
FIG. 13 is a block diagram illustrating a modification example of an overall configuration of a hybrid vehicle.

For example, as shown in FIG. 13, the control described in each of the aforementioned embodiments can also be applied to a hybrid vehicle 100A that is configured such that the engine 2 is coupled in series to the single motor-generator 10 via a clutch 15.

Besides, although not shown in particular, disclosed embodiments may be also applicable to a so-called series-type hybrid vehicle in which the engine 2 is employed for the sole purpose of driving the motor-generator 6, and the driving force of the vehicle is generated only by the motor-generator 10.

Besides, in each of the aforementioned embodiments, the hybrid vehicle 100 (100A) is a hybrid vehicle with the electrical storage device 16 that can be externally charged by the external electric power supply. However, disclosed embodiments may be also applicable to a hybrid vehicle that does not have the external charging mechanism (the electric power converter 23 and the connection portion 24). The CD mode/the CS mode are suited for externally chargeable hybrid vehicles, but should not be necessarily limited to externally chargeable hybrid vehicles.

Incidentally, in the foregoing, the engine 2 corresponds to an embodiment of "the internal combustion engine," and the motor-generator 10 corresponds to an embodiment of "the electric motor.". Besides, the ECU 26, 26A or 26B corresponds to an embodiment of "the control unit," and the power mode switch 28 corresponds to an embodiment of "the input device for selecting the driving priority mode." Furthermore, the economy mode switch 30 corresponds to an embodiment of "the input device for selecting the economy mode" in this disclosure, and the electric power converter 23 and the connection portion 24 form an embodiment of "the charging mechanism."

The respective embodiments disclosed herein are also supposed to be carried out in appropriate combinations. Then, the embodiments should be construed to be exemplary and non-restrictive in all respects. The scope of the disclosure is indicated not by the description of the aforementioned embodiments but by the claims, and is intended to encompass all modifications that are equivalent in significance and scope to the claims.

What is claimed is:

1. A hybrid vehicle comprising:
   an internal combustion engine;
   an electrical storage device;
   an electric motor that generates a running driving force upon being supplied with an electric power from the electrical storage device; and
   at least one electronic control unit configured to:
      select one of a charge depleting mode and a charge sustaining mode,
      cause the hybrid vehicle to run while making a changeover between a first running mode and a second running mode in accordance with a running situation of the hybrid vehicle in each of the charge depleting mode and the charge sustaining mode, wherein the first running mode is a mode in which the hybrid vehicle runs by the electric motor with the internal combustion engine stopped, the second running mode is a mode in which the hybrid vehicle runs with the internal combustion engine in operation, and a threshold of a power at which a changeover from the first running mode to the second running mode is made at a time when the charge depleting mode is selected being larger than the threshold at a time when the charge sustaining mode is selected, and change driving force characteristics of the hybrid vehicle resulting in a driving torque of the hybrid vehicle for a same vehicle speed and a same accelerator opening degree at the time when the charge depleting mode is selected being larger than the driving torque for the same vehicle speed and the same accelerator opening degree at the time when the charge sustaining mode is selected.

2. The hybrid vehicle according to claim 1, wherein the electronic control unit is configured to change the driving force characteristics of the hybrid vehicle resulting in a falling rate of the driving torque corresponding to an increase in vehicle speed at the same accelerator opening degree at the time when the charge depleting mode is selected being smaller than a falling rate of the driving torque corresponding to an increase in vehicle speed at the same accelerator opening degree at the time when the charge sustaining mode is selected, in a range where the driving torque of the hybrid vehicle is below a predetermined upper limit.

3. The hybrid vehicle according to claim 1, further comprising an input device configured to select a driving priority mode that realizes running with higher priority given to acceleration performance or responsiveness of the vehicle than to reduction in fuel consumption, wherein the electronic control unit is configured to change the driving force characteristics of the hybrid vehicle resulting in the driving torque of the hybrid vehicle for the same vehicle speed and the same accelerator opening degree at the time when the charge depleting mode is selected and the driving priority mode is selected being larger than the driving torque of the hybrid vehicle for the same vehicle speed and the same accelerator opening degree at the time when the charge depleting mode is selected and the driving priority mode is not selected.

4. The hybrid vehicle according to claim 1, further comprising an input device configured to select an economy mode that realizes running with higher priority given to reduction in fuel consumption than to acceleration performance of the hybrid vehicle, wherein the electronic control unit is configured to change the driving force characteristics of the hybrid vehicle resulting in the driving torque of the hybrid vehicle for the same vehicle speed and the same accelerator opening degree at the time when the charge depleting mode is selected and the economy mode is selected being smaller than the driving torque of the hybrid vehicle for the same vehicle speed and the same accelerator opening degree at the time when the charge depleting mode is selected and the economy mode is not selected.

5. The hybrid vehicle according to claim 1, further comprising a charging mechanism configured to charge the electrical storage device through a use of an electric power from an electric power supply outside the vehicle.

* * * * *